United States Patent [19]

Warren

[11] 4,296,430
[45] Oct. 20, 1981

[54] MAGNETIC RECORDING WITH REDUCED CROSS-TALK AND INTERCHANNEL TIME DISPLACEMENT

[75] Inventor: Henry R. Warren, Belle Mead, N.J.
[73] Assignee: RCA Corporation, New York, N.Y.
[21] Appl. No.: 84,395
[22] Filed: Oct. 12, 1979
[51] Int. Cl.³ .............................................. H04N 5/78
[52] U.S. Cl. ...................................... 358/8; 360/104
[58] Field of Search ................ 358/4, 8; 360/18, 19, 360/64, 76, 77, 104

[56] References Cited

U.S. PATENT DOCUMENTS 3,925,816  12/1975  Kihara ................................... 360/19
4,149,198  4/1979  Behr et al. ............................ 360/77
4,197,562  4/1980  Kikuya et al. ..................... 360/64 X

FOREIGN PATENT DOCUMENTS 54-0108611  8/1979  Japan ................................... 360/122

*Primary Examiner*—Alfred H. Eddleman
*Assistant Examiner*—Donald McElheny, Jr.
*Attorney, Agent, or Firm*—Paul J. Rasmussen; William H. Meise; Henry I. Steckler

[57] ABSTRACT

A multichannel recorder, such as for color video, reduces the width of recording heads that record low frequencies, and interchanges the order of one such head with a high frequency head. This both reduces crosstalk and keeps interchannel time displacement low.

4 Claims, 6 Drawing Figures

MAGNETIC RECORDING WITH REDUCED CROSS-TALK AND INTERCHANNEL TIME DISPLACEMENT

BACKGROUND OF THE INVENTION

The present invention relates to magnetic recording heads, and more particularly, to heads that are used in video tape recording such as for electronic news gathering apparatus.

In small portable recorders it is customary, due to the size and weight limitations, to record a video signal using two channels, one for the luminance signal and the other for the chrominance signal. The chrominance signal is usually directly recorded at base band, while the luminance signal is usually recorded using frequency modulation of a high frequency carrier. This approach allows a smaller headwheel to be used, while permitting the bandwidth and the signal-to-noise ratio to remain within acceptable limits. However, this approach does have problems. In particular, because of slight variations in tape tension across the width of the tape, one side of the tape may stretch slightly more than the other side during either recording or playback. This results in the chrominance signal begin slightly time displaced with respect to the luminance signal, and is therefore called "interchannel time displacement". To avoid this problem, it is desired to have the two recording tracks as close together on the tape as possible. Further, in order to minimize the size of the cassette, the length of the tape should be made as short as possible. This also requires that the recorded tracks should be made as close as possible. However, there is another problem in recording; during playback a head can pickup the recorded signal from an adjacent track, and during both record and playback inductive coupling between heads can occur. These effects are called "crosstalk". The crosstalk in the first case is proportional to the recorded wavelength, while the second crosstalk, since it is an inductive effect, increases at higher frequencies for a given fixed distance between adjacent heads. Therefore to minimize crosstalk, the heads should be located as far apart as possible. This clearly is in conflict with the requirement for minimizing the interchannel time displacement and tape length. It is possible to have the recording heads set at an azimuth angle to reduce the crosstalk, but this does not solve the problem since mistracking can occur which causes crosstalk despite the head angle.

It is therefore desirable to have a magnetic recording and playback head structure which minimizes both sources of crosstalk and interchannel time displacement.

SUMMARY OF THE INVENTION

In brief, this is achieved by having two pairs of magnetic heads, each pair comprising a wide head for recording high frequency information and narrow head for recording low frequency information. Each of the pairs have a gap between the heads comprising the particular pair. The order of the high and low frequency heads of one of the pairs is reversed with respect to the same order of the remaining pair. The pairs are mounted to provide that the recording tracks laid down on the tape by the low frequency heads have a guardband therebetween of the sum of the amounts by which the narrow heads differ in widths from the wide heads of the same pair respectively.

DETAILED DESCRIPTION

Figure 1:
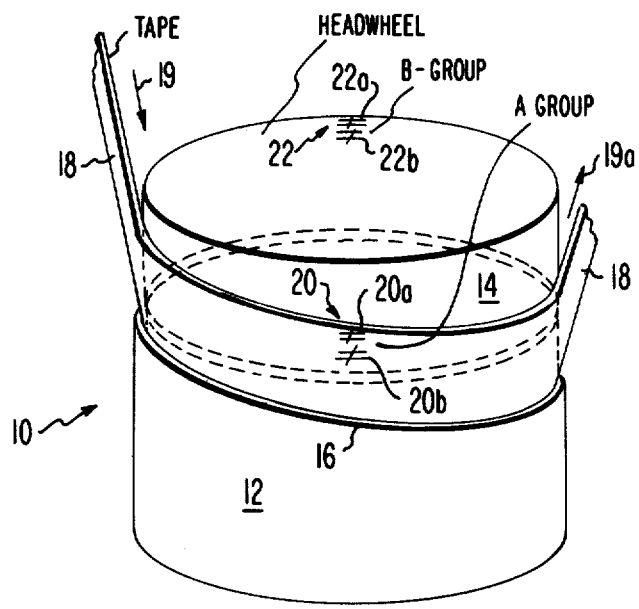
FIG. 1 shows a rotating drum for providing helical scan of a magnetic tape.
Figure 2:
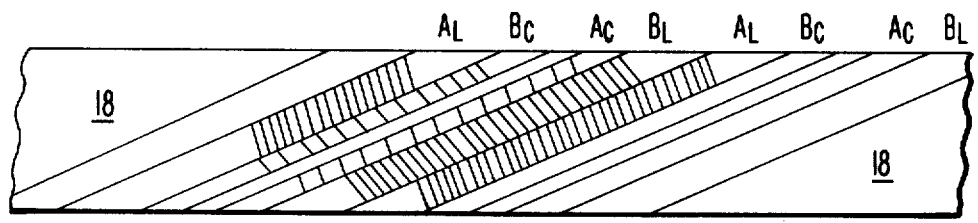
FIG. 2 shows the resultant tracks laid down on the tape when the heads are in accordance with the present invention.

In FIG. 1 there is shown generally a drum 10 comprising a bottom portion 12 and an upper headwheel portion 14. The bottom portion 12 contains a tape guide edge 16, which supports the magnetic recording tape 18 which is moving in the direction indicated by arrows 19 and 19a. The upper portion or headwheel 14 has mounted thereon two sets of recording or playback heads A group 20 and B group 22. A group 20 comprises an upper head 20a and a lower head 20b, while B group 22 comprises an upper head 22a and a lower head 22b. The gaps of the individual heads are shown by the diagonal lines. As shown in FIG. 1 groups 20 and 22 have head gaps that have azimuth angles that go in opposite directions. It should be noted that as viewed in FIG. 1, the front of the head gaps of group 20 is seen, but the rear of the gaps of group 22 is shown. Further group A heads 20 are mounted at a lower height than B group heads 22. As headwheel 14 rotates, and tape 18 moves, diagonal tracks such as shown in FIG. 2 will be laid down upon the tape 18. To more fully understand how this was arrived at, reference is made to FIG. 3.

Figure 3A:
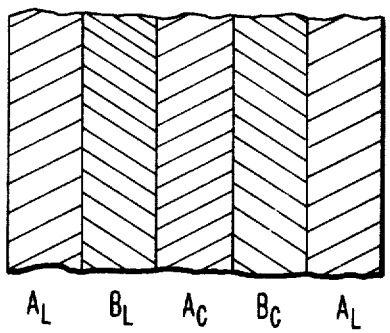
FIGS. 3a to 3c show various possible configurations of the recording tracks on a tape.
Figure 3B:
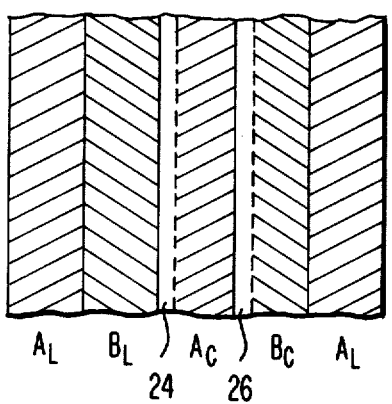
Figure 3C:
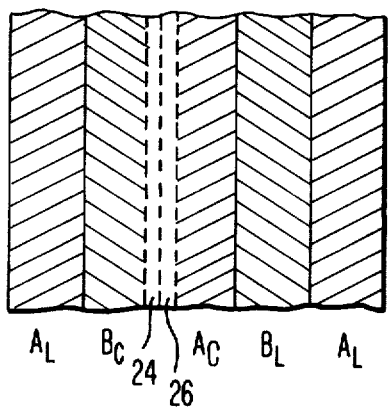

FIG. 3a shows a possible starting configuration for consideration of the magnetic tracks Here the tracks made by the A group 20 are so denominated and have a subscript L or C indicating whether it is a luminance or a chrominance signal respectively in the particular track. The first four tracks indicate the information recorded, the A group recording one field and the B group recording another field of the same frame. The fifth track shows the position of a recording path of an A group luminance head from the next frame. This pattern repeats across the tape and therefore is not shown further than the fifth track. The tracks are continuous to reduce interchannel time displacement. It will be noted that the two chrominance tracks $A_c$ and $B_c$ are next to each other. Since these tracks contain the low frequencies due to the fact that the chrominance signals are baseband recorded, this is the worst possible situation for crosstalk, which, as explained above, is worse at lower frequencies. It will be noticed that the heads of the two different groups have opposing azimuth angles which creates the herring bone recording pattern shown and that this pattern reduces the crosstalk between head pairs A and B. However, this may not be a sufficient reduction for the chrominance channels. One possible way of partially overcoming these problems is to reduce the width of the chrominance heads in each group. The reduced track width reduces the signal-to-noise ratio of the chroma signals but ordinarily the signal-to-noise ratio of the chroma channel is more than ample to allow for this reduction. This allows a thicker magnetic shielding material to be placed between the chrominance head and the respective luminance head of the same group. As shown in FIG. 3b, guardbands 24 and 26 result which reduce head-to-head crosstalk in playback and record. Guardband 26 lies between the two chrominance tracks $A_c$ and $B_c$. Guardband 24 reduces crosstalk between A chrominance and B luminance channels; but it would be more advantageous to have guardband 24 between the A and B chrominance tracks. However, there still may not be enough of the guardband to insure low track to head crosstalk between a chroma track and the chroma reproducing head of the other group.

By interchanging the position of the B group heads, one interchanges the position of the tracks $B_L$ and $B_C$. The result is that the guardbands 24 and 26 are now adjacent so that a double width guardband is created between the chrominance channels. This will further reduce the crosstalk due to track-to-head pickup when playing back either chrominance channel. Crosstalk involving the luminance channels is reduced enough because of the different azimuth angles, see FIG. 3c.

Figure 4:
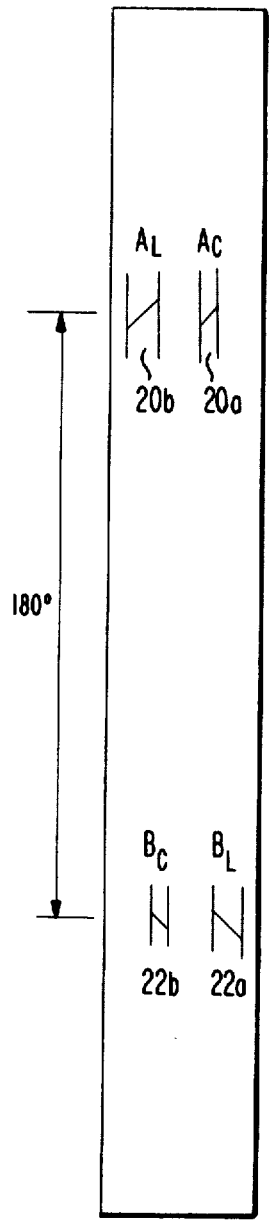
FIG. 4 shows a development of the positioning of the recording heads in accordance with the present invention.

FIG. 4 shows a development of headwheel 14 showing the head layout to achieve the above result. It will be noted that there is 180° displacement around headwheel 14 of A group 20 from the B group 22, and further that the B group 22 is axially offset with respect to the A group 22. It will therefore be appreciated that the track configuration of FIG. 2 is arrived at by using the head configuration of FIG. 4.

What is claimed is:

1. A magnetic head device for recording on magnetic tape, said device comprising a rotating drum, two pairs of magnetic heads, each pair comprising a wide width head for recording high frequency information and a narrow width head for recording low frequency information, each of said pairs having a gap between the heads comprising the pair, the order of the high and low frequency heads within one of said pairs being reversed with respect to the order of the high and low frequency heads of the remaining pair, said pairs being mounted on said drum to provide that the recording tracks laid down on the tape by the low frequency heads have a guardband therebetween of the sum of the amounts by which the narrow heads differ in widths from the wide heads of the same pair respectively.

2. A device as claimed in claim 1, wherein the heads within each of said pairs have the same azimuth angle, the azimuth angle of one pair of heads being opposite with respect to that of the other pair.

3. A device as claimed in claim 1, wherein said pairs are mounted one hundred eighty degrees apart on said drum.

4. A device as claimed in claim 1, wherein said wide heads record a television luminance signal, and said narrow heads record a television chrominance signal.

* * * * *